United States Patent
Robertson

[11] Patent Number: 5,309,688
[45] Date of Patent: May 10, 1994

[54] CONCRETE SLAB PENETRATION UNIT FOR PIPES

[76] Inventor: Paul Robertson, Lavel 15 Corporate Centre One Cnr Bundall R D2 Slayter Ave., Surfers Paradise, Australia

[21] Appl. No.: 752,499
[22] PCT Filed: Mar. 5, 1990
[86] PCT No.: PCT/AU90/00090
  § 371 Date: Sep. 3, 1991
  § 102(e) Date: Sep. 3, 1991
[87] PCT Pub. No.: WO90/10169
  PCT Pub. Date: Sep. 7, 1990

[30] Foreign Application Priority Data
  Mar. 3, 1989 [AU] Australia .............. PJ3022
  Jun. 29, 1989 [AU] Australia .............. PJ4977
  Sep. 29, 1989 [AU] Australia .............. PJ6618

[51] Int. Cl.[5] ................................ F16C 5/00
[52] U.S. Cl. ...................... 52/220.8; 52/221; 52/220; 52/232
[58] Field of Search ............ 52/204 OR, 221, 220, 52/302, 506, 1, 232

[56] References Cited

U.S. PATENT DOCUMENTS

| 4,086,736 | 5/1978 | Landrigan . | |
| 4,453,354 | 6/1984 | Harbeke . | |
| 4,625,940 | 12/1986 | Barton . | |
| 4,669,759 | 6/1987 | Harbeke . | |
| 4,848,043 | 7/1992 | Harbeke | 52/232 |
| 5,155,957 | 10/1992 | Robertson et al. | 52/221 |

FOREIGN PATENT DOCUMENTS

84/04795 12/1984 World Int. Prop. O. .

*Primary Examiner*—Carl D. Friedman
*Assistant Examiner*—Wynn Wood
*Attorney, Agent, or Firm*—Kimmel, Crowell & Weaver

[57] ABSTRACT

A penetration unit (10) for a concrete slab including a hollow housing (28) open at one end for receiving a service line or pipe (27), and provided at its other end with an enlarged opening surrounded by an annular flange (36) which enables connection of the housing (28) to formwork (37) defining the boundary the concrete slab. The housing (28) defines a hollow space (29) in which the service line or pipe terminates and may be connected to a further line or pipe such as an elbow (31). A puddle flange (32) may be located about the service line or pipe (27) and engage the housing (28). Intumescent material may be located in the hollow space surrounding the pipe or line (27).

19 Claims, 7 Drawing Sheets

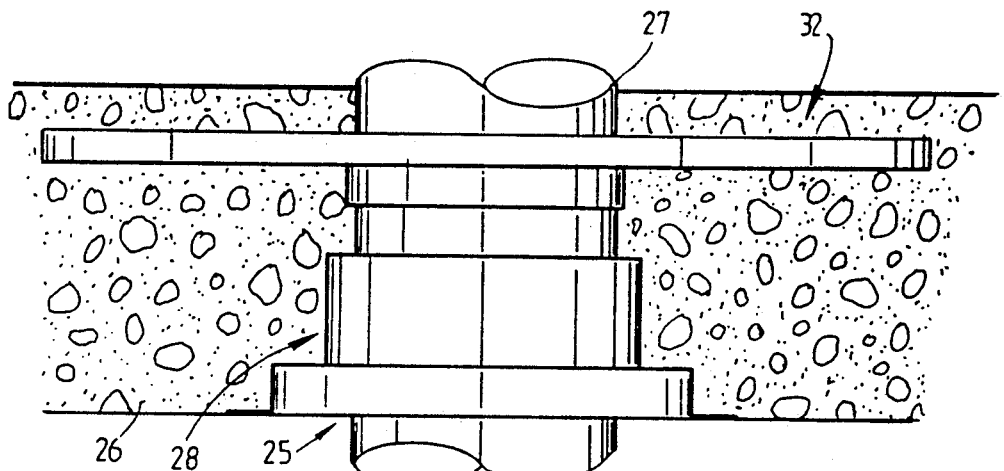
FIG.3
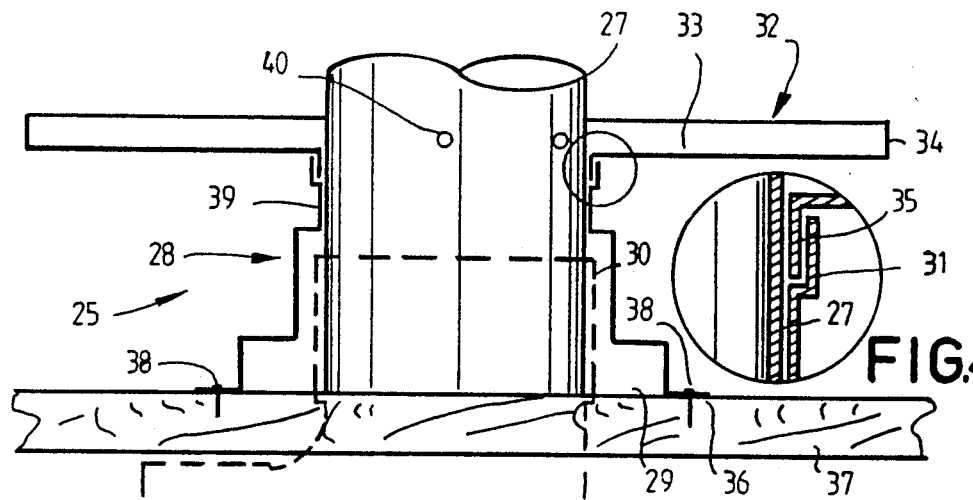
FIG.4
FIG.4A

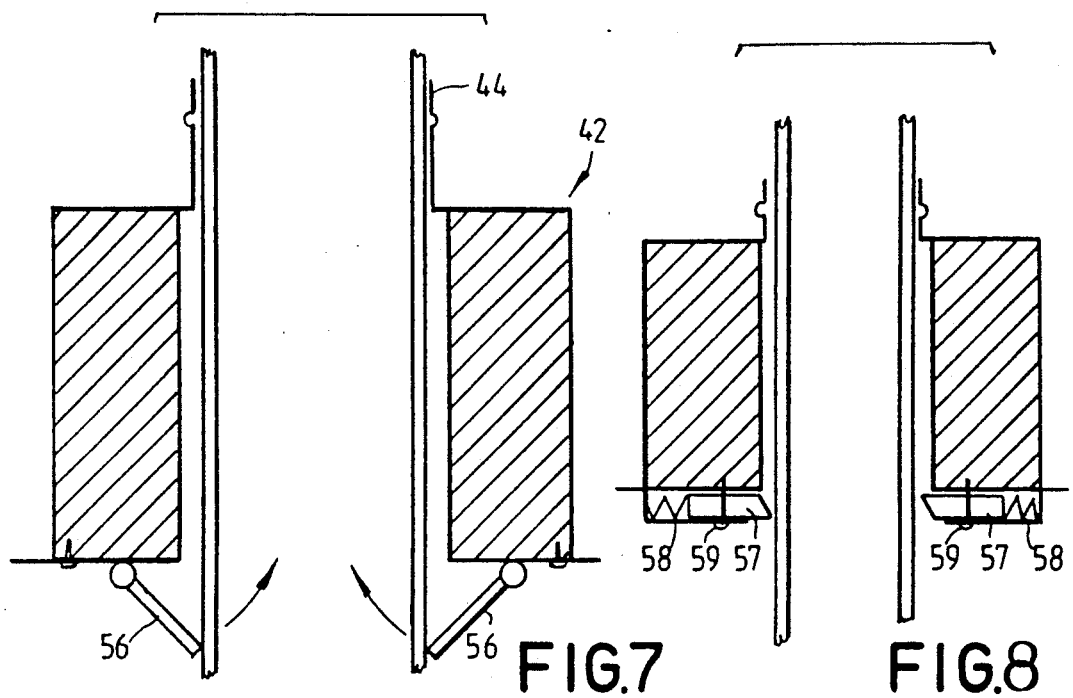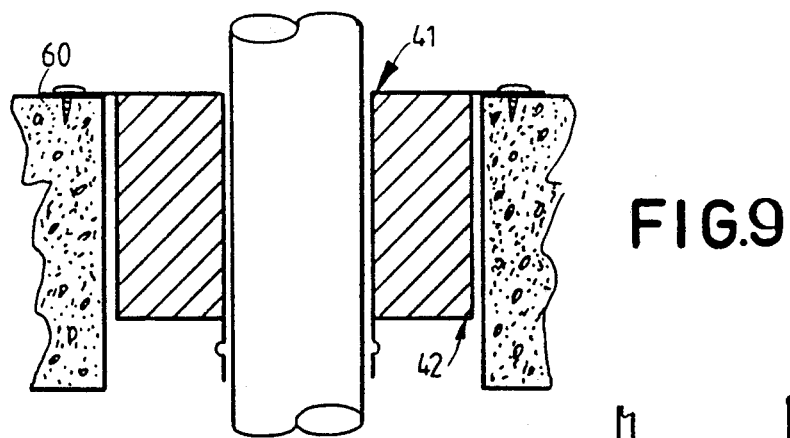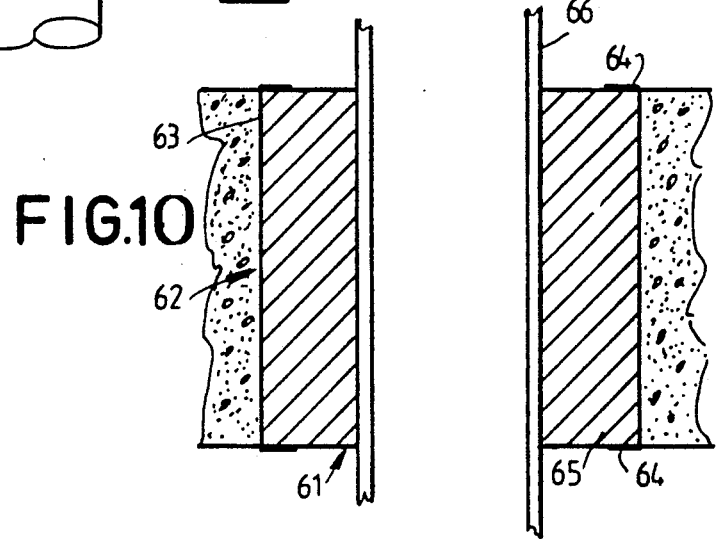

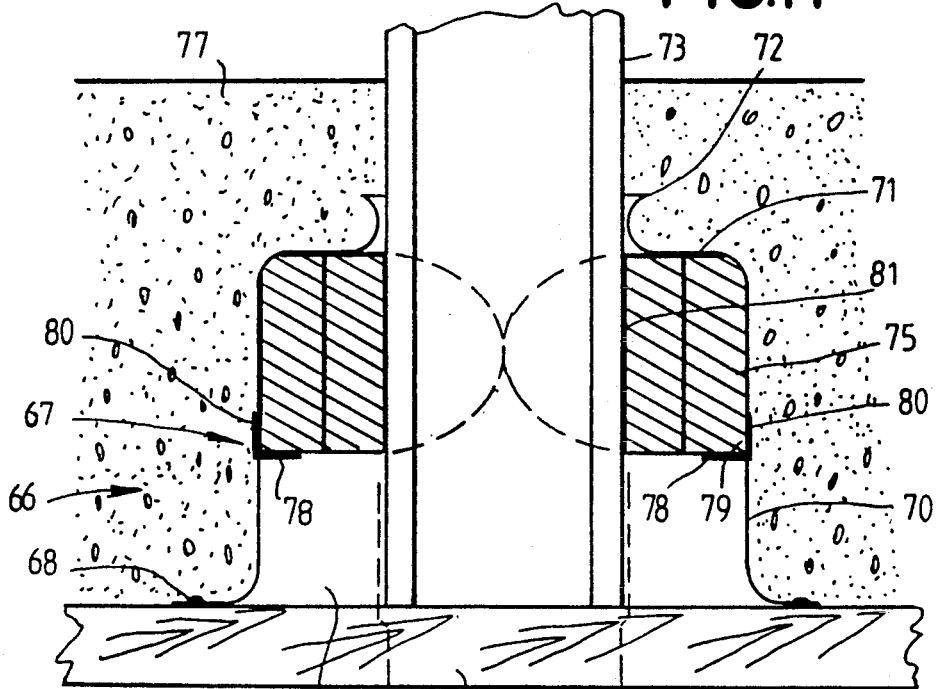
FIG.11
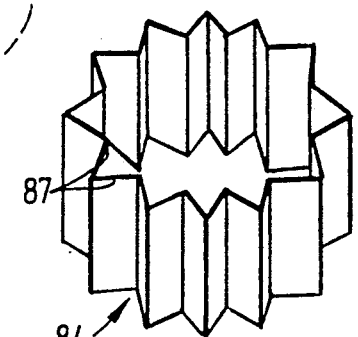
FIG.12a
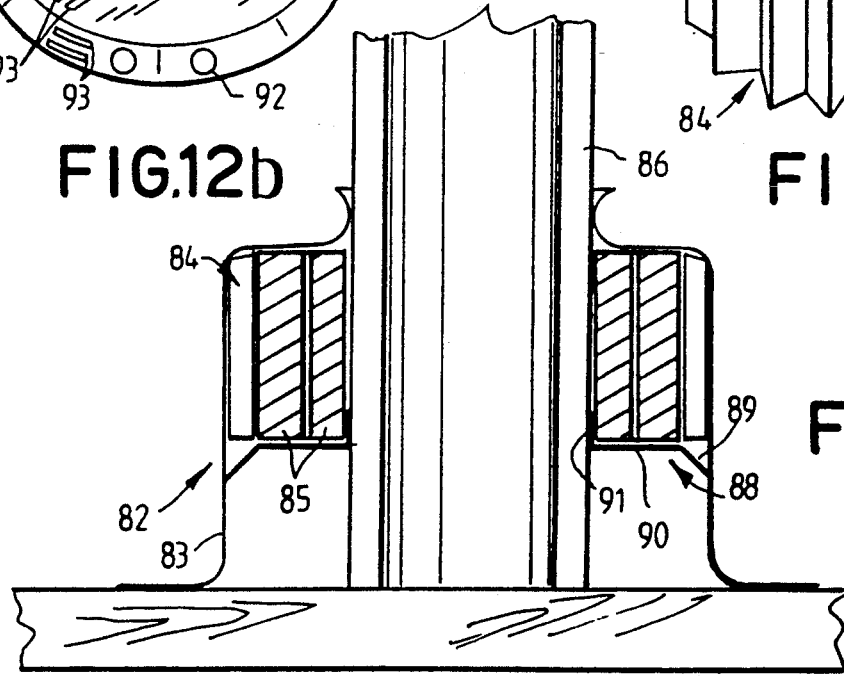
FIG.12b
FIG.12

CONCRETE SLAB PENETRATION UNIT FOR PIPES

FIELD OF THE INVENTION

This invention relates to improvements to penetration units particularly for concrete slab walls, floors or ceilings and in one aspect to units for use in low rise buildings. In a further aspect the present invention relates to penetration units which serve as fire stop collars for use in high rise buildings or in other situations.

BACKGROUND ART

It is common practice in the erection of high rise buildings to provide a means whereby concrete slabs, for example flooring slabs, can be penetrated by service lines or pipes. In high rise buildings particular requirements as regards fire safety and materials used are specified, however, the same fire rating level is not required in lower rise buildings. It is important, however, to ensure that the slabs of lower rise buildings are water sealed, for example, in bathroom areas.

A number of different methods have been proposed for penetrating slabs such as those disclosed in U.S. Pat. Nos. 2,694,847, 3,004,320, 2,234,784, 3,276,176 and 2,968,855. In the above patents a sleeve is secured to formwork where an aperture is to be provided and concrete applied about the sleeve which is then removed with the formwork leaving an aperture for the passage of service lines. In such arrangements it is necessary to fill the aperture about the service line which has been passed therethrough to ensure appropriate fire ratings are met. The underneath side of the aperture is often required to be patched with cement or the like which causes difficulties because proper support to the patch cannot be provided, so that in many cases paper, boards or other materials are used to close the aperture before pouring concrete from the top side. Often this results in the underside of the aperture having a jagged bottom edge making awkward the provision of an aesthetically pleasing patch. The above procedure also may result in poor water proofing and the loss of fire rating. Further in this method if jointing of the service line of say an elbow is required, such joints must be located externally of the formed slab.

Other forms of penetration units are shown in U.S. Pat. Nos. 4,261,598, 4,077,599, 3,933,336, 3,346,230, 4,619,471, 4,159,099, 3,800,486, 4,623,170, 3,328,055 and 4,488,388. The units described in each of the above U.S. Patents have further disadvantages and are not suited to the present application. For example, U.S. Pat. No. 4,261,598 describes a coupling which enables the connection of pipes within a slab, however, such arrangements are not allowable in many situations. Similar comments apply to U.S. Pat. No. 3,328,055 wherein a threaded connector is embedded in concrete to penetrate a concrete slab and for enabling threaded interconnection within the slab to other pipe members. Other arrangement such as in U.S. Pat. No. 4,488,388 result in the placement of a pipe supporting clamp within a slab which serves to grip a pipe which is passed through the sleeve. Other penetration units described in the above U.S. Patents are not suited to use with relatively thin slabs and also do not enable easy coupling of a pipe or duct which is passed through the slab with other connection elements.

In high rise buildings where PVC pipe work is used for a service line or duct it is important to ensure that the pipes are closed off in the event of fire so that smoke, gases and flame cannot travel through the pipes between different floors of the building. At present, means used for penetrating slabs for the passage of service lines or pipes do not incorporate means for efficiently preventing the passage of gases and flames through the service lines or pipes between floors.

SUMMARY OF THE PRESENT INVENTION

The present invention thus provides in a first aspect a penetration unit particularly but not exclusively applicable to low rise buildings which will serve to efficiently enable the penetration of a concrete slab of a wall, floor or ceiling and which in one preferred form will serve to seal slabs against water seepage. The present invention also aims to provide a penetration unit which facilitates connection of a service line with another service line and a unit which may be assembled rapidly and which is simple in use. The present invention also aims to provide a method of penetrating a slab using a unit of the above type. In a further aspect the present invention provides a Penetration unit applicable primarily to high rise buildings which incorporate means to prevent flames or gases passing through floors of a building. Other objects and advantages of the invention will become apparent hereunder.

With the above and other objects in view the present invention provides in a first aspect a penetration unit comprising hollow housing means adapted to accept a service line or pipe, said housing means being adapted to be disposed within a slab of settable material adjacent one side thereof, said housing means including first and second opposite ends, a first opening at said first end of said housing means for receiving and engaging said service line or pipe, a second opening at said second end of said housing means, said second opening being larger than said first opening, said housing means including side wall means between said first and second ends of said housing means and surrounding a hollow space within said housing means, annular flange means at said second end of said housing means surrounding said second opening whereby said housing means may be secured to formwork defining one side of said slab during the formation thereof, said service line or pipe extending into and having an end terminating within said hollow space, said end of said service line including coupling means permitting coupling of said service line or pipe to a further said service line or pipe in said space.

The coupling means may comprise the male end of said service line or pipe or alternatively said coupling means may comprise a female socket on the end of said service line or pipe.

Preferably, said side wall means of said housing means is substantially cylindrical and extends between said second end and an end wall, said end wall means extending inwardly from said cylindrical wall to said first opening. Suitably, said end wall means terminates in sleeve means, said sleeve means surrounding said first opening and engaging and supporting said service line or pipe. Preferably, said housing means includes an annular enlargement adapted to be disposed within said slab for retaining said housing means within said slab.

The unit may also include puddle flange means arranged about said service line or Pipe, said puddle flange means being adapted to collect water or other moisture passing through said slab, said service line or pipe being apertured to receive said collected water or moisture. Suitably, connecting means are provided for coupling said puddle flange means to said housing means. Preferably, said connecting means comprises cooperative annular coupling means on said puddle flange means and said housing means.

The present invention also provides a method of penetrating a slab using a penetration unit of the type described above, said method including the steps of locating said housing means over said service line or pipe, releasably securing said annular flange means of said housing means to formwork defining the boundary of a slab of settable material to be formed on said formwork and pouring settable material onto said formwork to cover said housing means.

In a further aspect, the present invention provides a penetration unit comprising hollow housing means adapted to accept a service line or pipe, said housing means being adapted to be disposed within a slab of settable material adjacent one side thereof, said housing means including first and second opposite ends, a first opening at said first end of said housing means for receiving said service line or pipe, a second opening at said second end of said housing means, said second opening being larger than said first opening, said housing means including side wall means between said first and second ends of said housing means and surrounding a hollow space within said housing means, annular flange means at said second end of said housing means surrounding said second opening whereby said housing means may be secured to formwork defining one side of said slab during the formation thereof, said service line or pipe extending into and having an end terminating within said housing means, and an intumescent material within said space, said material expanding when subject to heat to close over said service line or pipe and prevent smoke gas or flames from passing therethrough, said material defining with said service line or pipe an annular space for enabling coupling of said service line or pipe to a further said service line or pipe.

Preferably, said unit includes tab means for maintaining said material within said housing means, said tab means comprising portion of said side wall means displaced from said side wall means. The unit may also include an insert in said hollow space for retaining said material in said space, said insert including a cylindrical wall spaced from said service line or pipe, said material being disposed between said cylindrical wall and said side wall means of said housing means. The unit also may include outwardly directed flange means surrounding said first opening, said flange means cooperating with said settable material to maintain said housing means within said slab.

In a further form, said intumescent material is disposed adjacent said first end of said housing means, said material leaving free the region of said hollow space adjacent said second end of said housing means for the coupling of said service member to said service line or pipe.

Spacer means may be provided between said intumescent material and said side wall means of said housing means, said spacer means defining a plurality of passages for communicating heat to said intumescent material adjacent said first end of said housing means. The unit may also include retainer flange means engaging said side wall of said housing means and retaining said material adjacent said first end of said housing means, said flange means being apertured to permit the passage of heat therethrough.

The unit may further include first and second opposite closure members disposed at said second end of said housing means, and biasing means for biasing said closure members inwardly towards each other, said closure members closing off said service line or pipe upon softening thereof when subject to heat. Suitably, heat sensitive means normally maintain said closure members spaced from said service line or pipe, said heat sensitive means releasing said closure members to close said service line or pipe when subject to heat.

The present invention further provides a method of penetrating a slab using a unit of the type described above, said method including the steps of locating said penetration unit about said service line or pipe and securing the said unit to formwork defining the boundary of a slab to be formed, pouring settable material onto said formwork and about said housing and removing said formwork after said settable material has cured whereby said unit is retained within said formed slab.

In yet a further aspect, the present invention provides a fire stop collar comprising hollow housing means adapted to accept a service line or pipe, said housing means including first and second opposite ends, a first opening at said first end of said housing means for receiving said service line or pipe, a second opening at said second end of said housing means, said second opening being larger than said first opening, said housing means including side wall means between said first and second ends of said housing means and surrounding a hollow space within said housing means, said service line or pipe extending into and having an end terminating within said housing means, and an intumescent material within said space, said material expanding when subject to heat to close over said service line or pipe and prevent smoke gas or flames from passing therethrough, said material defining with said service line or pipe an annular space for enabling coupling of said service line or pipe to a further said service line or pipe.

BRIEF DESCRIPTION OF THE DRAWINGS

In order that the invention may be more readily understood and put into practical effect reference will now be made to the accompanying drawings which illustrate the preferred embodiments of the invention and wherein:

FIG. 3 is a side elevational view of a further form of penetration unit located within a concrete slab;

FIG. 4 is a sectional elevational view illustrating the components of the penetration unit prior to concrete pour;

FIG. 4a is an enlarged view of the region A of FIG. 4 showing the connection between the puddle flange and housing;

FIG. 7 to 10 illustrate in sectional view further embodiments of the invention;

FIG. 11 is a sectional view of a further form of a penetration unit according to the invention within a slab;

FIG. 12 illustrates yet a further embodiment of penetration unit according to the invention;

FIG. 12a illustrates a preferred form of spacer for use with the unit of FIG. 11;

FIG. 12b illustrates a preferred form of retaining plug for use with the unit of FIG. 11;

DETAILED DESCRIPTION OF THE INVENTION

Figure 1:
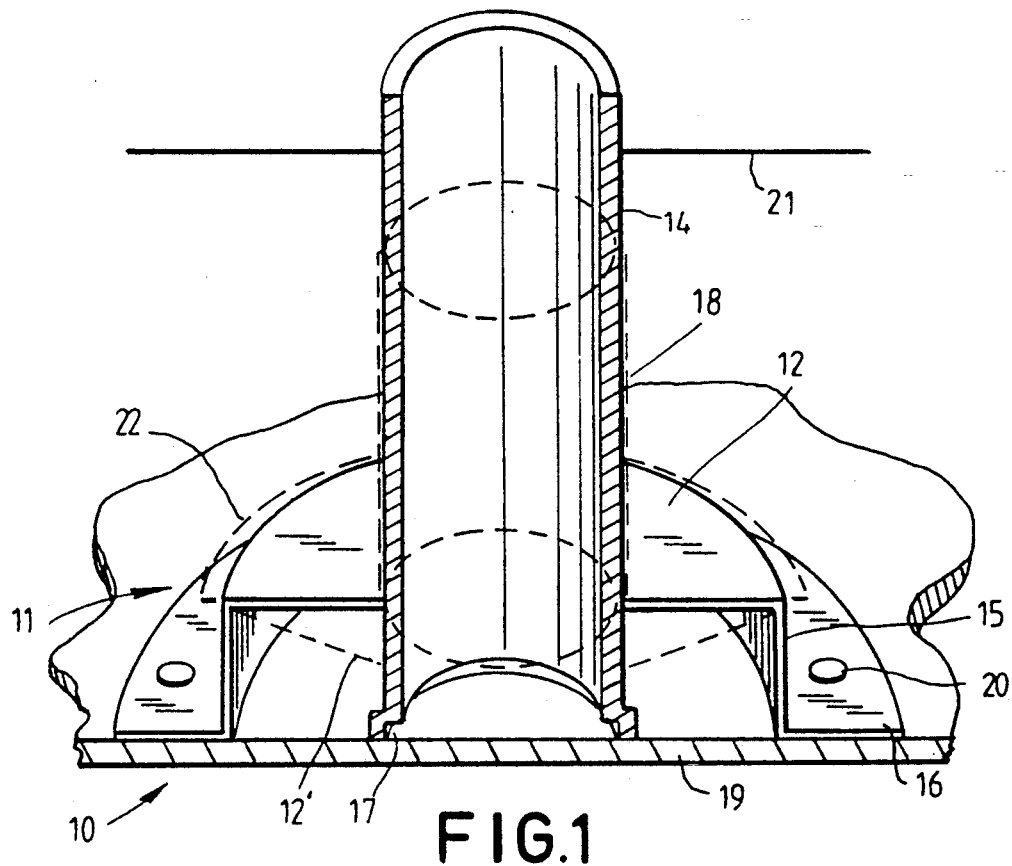
FIG. 1 is a sectional view of a first form of penetration unit according to the present invention.

Referring to the drawings and firstly to FIG. 1 there is illustrated a first form of penetration unit 10 according to the present invention for penetrating a concrete slab. The unit 10 includes a dish-shaped hollow housing 11 having a circular base 12 which is centrally apertured at 13 to receive a section of a service line or pipe 14 therethrough. The dish-shaped body 11 further includes an annular wall 15 which extends from the base wall 12 in the direction of the service line or pipe 14 to terminate in an outwardly directed annular flange 16.

As shown the service line or pipe 14 is provided with a female socket 17 to enable the service line or pipe 14 to be connected to a further line. Alternatively, the female socket 17 may be substituted by a male socket or connection with a complementary female socket of a further pipe member. The service line or pipe 14 may be secured to the base wall 12 in the region of the aperture 13, for example by welding or soldering in the case where the housing 11 and pipe 14 are formed of metal or by adhesives where they are formed of plastic. To further support the service line or pipe 14 the base 12 may be provided with an extended sleeve 18 which neatly locates about the service line or pipe 14.

In use the flange 16 may be secured to formwork 19 forming the boundary of the concrete slab to be formed such as by means of clouts 20. Concrete is then poured about the unit 10 to say the level 21 so that portion of the service line or pipe 14 projects above the poured concrete. After curing the formwork 19 may be removed leaving the unit 10 embedded within the slab and permitting access on both sides to the service line or pipe 14. The hollow space defined by the annular wall 15 permits ready access to the socket end 17 whereby connection to a further pipe member or connector may be facilitated. Furthermore, the base wall 12 presents a neat appearance from the underside.

If desired the housing 11 may be provided with a flange 22 to enhance retention of the housing 11 within the slab. Alternatively such a flange may be provided about the sleeve 18.

The housing 11 may when the pipe 14 and housing 11 are constructed of metal material such as copper comprise a puddle flange or puddle collection means. For this purpose the pipe 14 is secured in the aperture 13 to the housing base 12 (with the socket end 17 spaced from the formwork 19) by soldering or welding. A downward force is then applied to the pipe 14 so that the base wall 12 is deflected downwardly to the position shown in dotted outline at 12' to thereby form a moisture capturing funnel. An aperture or apertures may then be formed in the pipe 14 adjacent its connection to the base 12' so that any moisture captured by the funnel shaped base 12' will be directed into the interior of the pipe 14 for passage to drain.

Figure 2:
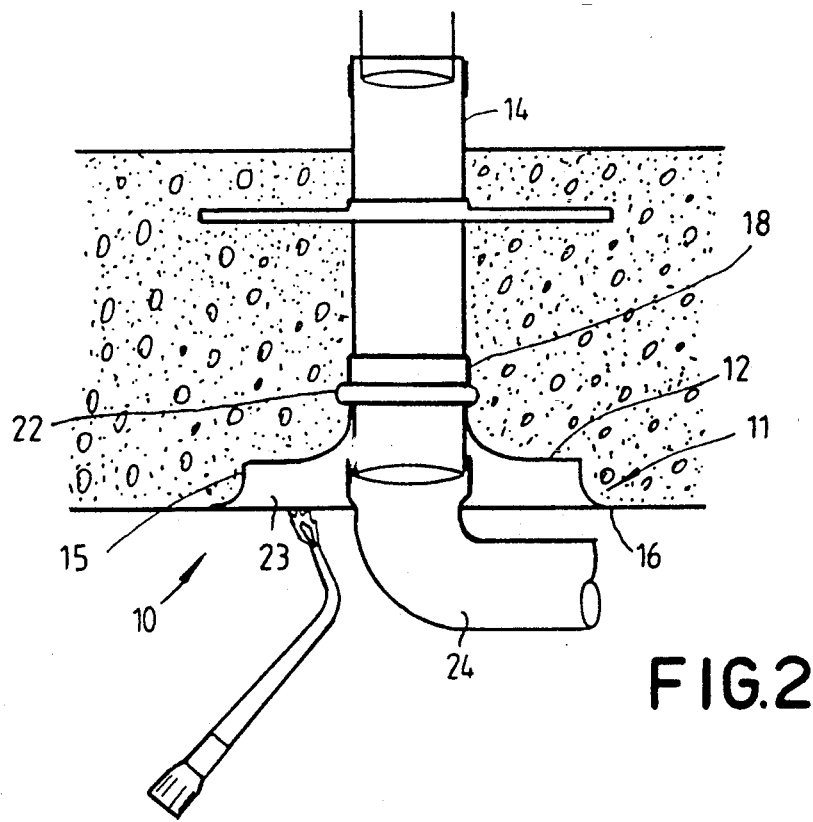
FIG. 2 is a side elevational view of a second form of penetration unit according to the invention within a slab.

FIG. 2 illustrates an alternative form of penetration unit according to the present invention similar to the embodiment of FIG. 1 and wherein like parts have been given like numerals. This unit 10 includes a hollow housing 11 defined by an annular side wall 15 and an end wall 12 with an annular flange 16 being provided about the side wall 15 to enable securement of the unit to formwork. The end wall 12 merges in to a coaxial sleeve 18 which is arranged to receive and engage the service line or pipe 14, the sleeve 18 being provided with an annular enlargement 22 to facilitate retention of the housing in the concrete slab. Installation of this unit is the same as described above. Upon removal of the formwork, the hollow region 23 enclosed by the wall 15 permits easy access for tools such as the torch illustrated to facilitate connection of the pipe 14 with an elbow 24 or other pipe or connector. This arrangement provides improved safety as the concrete in the slab is not exposed to the flame of the welding torch, being separated by the end wall 12 of the housing 11.

Referring now to FIGS. 3 and 4, there is illustrated an alternative penetration unit 25 according to the present invention adapted for location within a concrete slab 26 and associated with a pipe 27 which for example may comprise a waste pipe formed of PVC or other plastics material and which may be connected into the plumbing system of a building. The penetration unit 25 includes a first hollow housing 28 which is externally stepped to avoid creating an excess void in the slab and which surrounds the pipe 27 and is engaged therewith and which also defines with the pipe 27 an annular space 29 about the lower end of the pipe 27 for receipt for example of a socket end 30 of an elbow connector 31 shown in dotted outline in FIG. 3 or alternatively a socket of a further pipe.

The housing 28 also defines with the pipe 27 an annular recess 31 adjacent its upper end for engagement by a puddle flange 32. The puddle flange 32 as shown includes a main circular body portion 33, an upstanding rim portion 34, and an annular flange portion 35 for engagement within the recess 31. The flange portion 35 also has an internal diameter such that it may be slid over the pipe 27 and into the recess 31. The housing 28 further includes an annular fastening flange 36 at its end opposite the recess 31 for securing the housing 28 to formwork in the manner described below.

In using the penetration unit 25 of the invention, the housing 28 is initially slide over the pipe 27 and secured to formwork 37 defining the boundary of the concrete slab to be formed. For this purpose, nails or clouts 38 are passed through the flange 36 into the timber formwork 37. If desired, the housing 28 is secured to the pipe 27 by means of adhesives or welding at 39. The puddle flange 32 may then be slid over the pipe 27 so that the annular portion 35 extends into the recess 31. If desired for water proofing purposes, the flange portion 35 may be glued or welded in position to the housing 28 and the pipe 27. The pipe is also apertured at 40 so that water gathering in the puddle flange 32 may pass into the pipe 27. Concrete may then be poured onto the formwork 37 and about the housing 28 and the puddle flange 32 either so that the puddle flange 32 is disposed within the concrete as shown or so that the puddle flange 32 is disposed at or adjacent to the concrete level. When the concrete has hardened or cured, the formwork 37 may be removed leaving the unit 25 in situ within the concrete slab 26. The pipe 27 may then be coupled to the elbow 31 as shown in FIG. 3 or to any other pipework.

Preferably, both the housing 28 and puddle flange 32 are formed of plastics material such as PVC and thus a solvent adhesive may be used between these components and the pipe 27. The enlargement of the housing 28 defining the recess 29 serves to ensure that the penetration unit 25 remains lodged in the concrete after concrete pour. It will also be apparent that as the puddle flange 32 is fitted after the housing 28 is secured to the formwork 37, full access is provided to the clouts 38 without interference from above.

Figure 5:
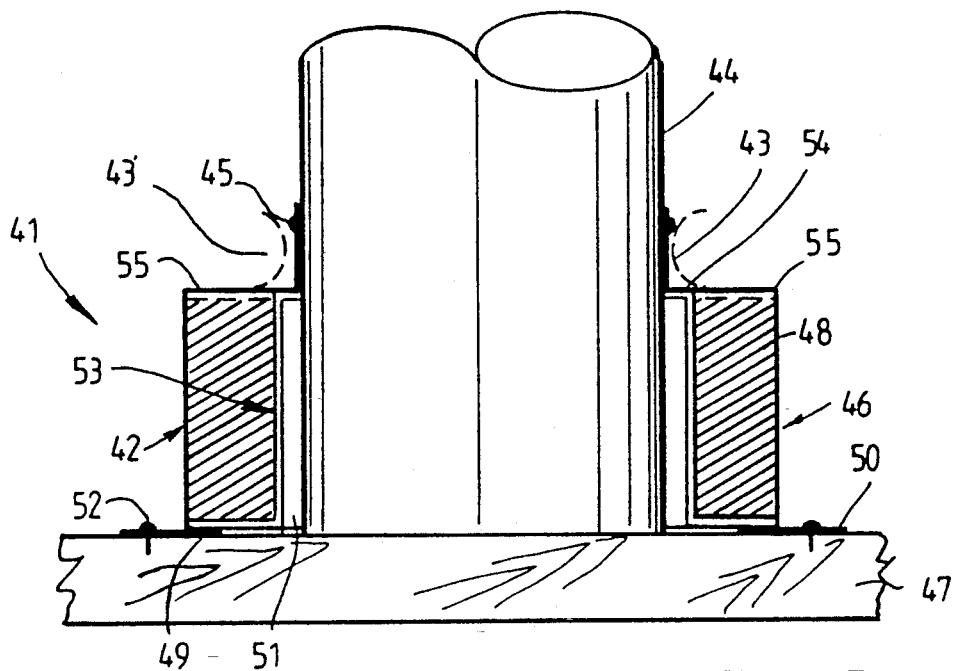
FIG. 5 is a sectional elevational view of a further form of penetration unit according to the invention.
Figure 6:
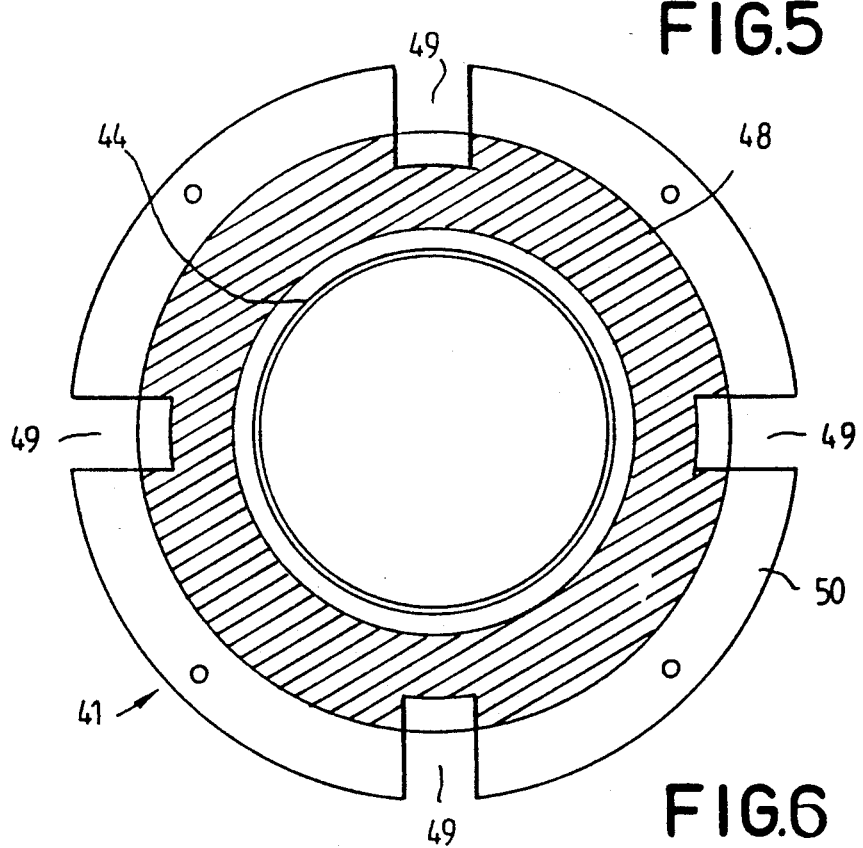
FIG. 6 is an underside view of the unit of FIG. 5.

Referring now to FIGS. 5 and 6, there is illustrated a further embodiment of penetration unit 41 according to the invention. In this embodiment, the unit 41 is primarily for use with PVC or other plastics service lines or pipes in high rise buildings where a fire rating is required. The unit 41 in this embodiment is similar to that of FIGS. 3 and 4 although excluding in this instance the recess 31. It should be noted, however, that the unit 41 may include a recess similar to the recess 31 and be used in conjunction with a puddle flange 32.

The unit 41 which is suitably formed of metal such as steel includes a hollow annular housing 42 including an upper annular ring portion 43 which closely surrounds and engages the PVC pipe 44. Preferably, the ring portion 43 is provided with a radial bead 45 to assist in maintaining the housing 42 in the concrete slab subsequent to formwork removal. The housing 42 is generally cylindrical and also defines with the pipe 44 an annular recess 46 adjacent the formwork 47 which accommodates an intumescent wrap or material 48. The wrap 48 is maintained in the recess 46 by a plurality of fingers 49 which comprise portions of an annular flange 50 at the end of the housing 42 which are slit and turned inwardly as shown more clearly in FIG. 6 to overlie the recess 46. The recess 46 is not filled by the wrap 48 but leaves an annular space 51 so as to enable coupling of pipework to the pipe 44 by permitting a socket thereof to be slid between the wrap 48 and the pipe 44. The annular flange 50 may be apertured if desired so that clouts 52 may be used to secure the housing 42 in position.

In use, the housing 42 is secured to the formwork 47 by means of the clouts 52 and the concrete pour is then made about the housing 41 and pipe 44 with the housing 41 supporting the pipe 44 on the formwork 47 before and after concrete pour to a level so that the pipe 44 projects thereabove. After concrete curing or hardening, the formwork 47 is removed leaving the housing 42 within the concrete supporting the pipe 44. In the event of fire, the intumescent wrap 48 in the recess 46 will rapidly expand causing the softened pipe 44 to be radially closed so that smoke, gas and flame is prevented from passing to the next level in the building. If desired an annular insert 53 having a generally L-shaped cross-section may be provided to hold the wrap 48 in the housing 42. Suitably the insert 53 comprises an injection moulded plastics material which is sized so that the space 51 is left to allow coupling of a further pipe or socket.

The annular flange 43 may be eliminated where the unit 41 is used for wall applications. Alternatively the flange may be of the form shown in dotted outline in FIG. 5. In this arrangement the flange 43' is located outwardly of the pipe 44 so as to allow the pipe 44 to freely extend into the housing 42 without touching the flange 43'. This then eliminates wear in the event that the housing 42 is metal and the pipe 44 is plastic. So that the pipe 44 can be supported in an upright attitude in this arrangement, the insert 53 may include an inwardly directed flange 54 or rib which may engage the pipe 44 to support same.

In yet an alternative configuration, the insert 53 may include as upper flange 55 (shown in dotted outline) so that the insert is in the form of a spool about which the material 48 may be wrapped prior to its location within the housing 42.

This unit 41 is designed for slabs of small depth (approximately 100 mm or less) with the height of the housing 42 being in the order of 50 mm. This provides the desired fire rating in "thin" slabs whilst in thicker wall slabs, a pair of units 41 may be provided adjacent each side of the wall slab.

If desired other means may be provided for assisting in closing over the pipe 44 in the event of fire. Such means as shown in FIGS. 7 and 8 may be used in conjunction with the intumescent wrap or separately without use of wrap 35.

In the embodiment of FIG. 8, a pair of members suitably metal plates 56 are pivotally secured to opposite sides of the housing 42 to normally be urged against the pipe 44 under spring biasing pressure provided by leaf springs or other biasing means. Again in the event of softening of the pipe 44 due to heat influences, the plates 56 will pivot inwardly towards each other to thereby collapse the pipe 44.

In the embodiment of FIG. 8, a pair of opposite slider members 57 are provided, each being urged inwardly towards each other by springs 58 but which are held in position away from the pipe 44 by heat sensitive pins 59 which extend into the housing 42. When subject to heat, the pins 59 will melt or fall out so as to permit the members 57 to move inwardly under spring pressure towards each other to collapse the pipe 44.

The unit 41 described above may as shown in FIG. 9 be used in a building where the is an existing floor slab 60. In this case, the housing 42 may simply be slid into the existing penetration aperture and fixed either to underside of the slab as shown or the top sides. In this embodiment, the further pipe collapsing means as described in FIGS. 7 and 8 may be incorporated. Alternatively, as shown in FIG. 10, the penetration unit 61 may comprise a generally cylindrical housing 62 which locates within a penetration aperture 63 in a wall slab and which includes opposite end walls or fingers 64 which contain the intumescent wrap 65, the latter again serving to collapse the pipe 66 in the case of fire.

In a further modification, the housings 42 or 61 for the intumescent material may be apertured in their ends and/or side walls so as to permit more rapid transmission of heat from a fire to the intumescent material and thus more rapid pipe closing.

The unit 41 may also be secured to a plaster board wall or other walls preferably by means of screws in place of the clouts 50 to support a pipe passing through the wall and providing the desired fire rating. In this case the flanges 43 or 43' may not be required. In a similar manner, the unit 41 may be secured to a concrete slab wall or floor coaxially with an existing penetration aperture through the wall.

FIG. 11 illustrates an alternative embodiment of penetration unit 66 according to the present invention which is similar to the embodiment of FIG. 5 and which includes a hollow housing 67 suitably of circular cross-section and which includes an annular flange 68 at one end which may seat upon formwork 69 and which may be secured thereto prior to pouring of a concrete slab whose boundaries are defined by the formwork 69.

The housing 67 also includes a cylindrical side wall 70 which extends from the flange 68 and a transverse wall 71 at its opposite end which terminates in an arcuate annular flange 72 which defines an aperture 74 for freely receiving a pipe 73 and suitably a plastics pipe.

Located within the housing 67 is an intumescent wrap 75 which is suitably in the form of two layers but which may be any number of layers and which also firmly engages the outer surface pipe 73 to ensure that the pipe is supported in an upright attitude during the concrete pour. As shown the wrap 75 terminates at a position spaced from the formwork 69 so as to leave an open region 76 about the end of the pipe to enable unhindered coupling with a further pipe or other connector such as an elbow (shown in dotted outline).

In use the unit 66 is secured to formwork 69 where the service line such as the pipe 73 is to pass through a slab. For this purpose nails or other similar fasteners may be driven through the flange 68 to secure the housing 67 in position. Alternatively the flange 68 may be provided with cut-out portions in its periphery for accepting such fasteners. The pipe 73 is inserted into the housing 67 in the manner shown in FIG. 11 so as to be supported in an upright attitude and the concrete is then poured onto the formwork 69 and about the housing 67 to form the slab 77.

When the concrete has cured the formwork 69 is removed whilst the housing 67 will remain embedded in the concrete with retention in the concrete being facilitated by the arcuate flange 72 which resists detachment of the housing 67. The pipe 74 is then coupled with a further pipe or joint at the region 76.

In the event of a fire in the region of the housing 67 such that the wrap 75 is subject to a temperature increase and such that the pipe 73 softens, the wrap 75 will radially expand as shown in dotted outline thus collapsing the softened walls of the pipe 74 so that heat, smoke, fumes and fire will not pass up through the pipe 73 to the next floor of the building.

The housing 67 may be in many different forms and means other than the -arcuate flange 72 may be provided for retaining the housing 67 in the slab. For example such means may comprise other radially enlargements on the flange 72 or the housing 67. If desired means in the form of turned-in portions or tabs 78 of the housing 67 or separate fasteners may be provided to retain the wrap 75 in the position shown. Where the turned in portion 78 leave apertures 79 in the side wall 70 of the housing 67, plugs 80 may be inserted into the apertures 79 to prevent entry of concrete during formation of the slab. The pipe 73 is a neat sliding fit in the wrap 75 so as to be easily inserted into the housing 67 and so that during concrete pour no concrete enters the housing 67 through the aperture 74.

The wrap 75 may be further supported by an insert 81 similar to that shown in FIG. 5. The insert 81 also serves to firmly engage and support the pipe 74 in an upright attitude.

FIG. 12 illustrates yet a further embodiment of penetration unit 82 which is similar to the embodiment of FIG. 11 and which is used in the same way as the embodiment of FIG. 11 being cast in situ in a slab. The unit 82 includes a hollow housing 83 of the same form as that shown in FIG. 11 and so as to improve efficiency of operation, a spacer 84 is provided between the intumescent wrap 85 and the inner wall of the housing 83. This spacer 84 serves not only to maintain the intumescent wrap 85 in position by frictionally urging same against the wall of the pipe 86 but also serves to define a path for heat to the wrap 85 at the upper end of the housing 83.

For this purpose, the spacer 84 is preferably of the form shown in FIG. 12a being of crimped sheet metal to define a plurality of longitudinally extending passages 87 for heat conduction. Suitably the corrugations in the spacer 84 are of a depth of 1 mm-2 mm. A spacer 84 of crimped or corrugated form will exhibit the necessary heat conducting properties and will also exhibit some resilience in the radial direction so that various thickness of intumescent wrap can be accommodated and held in position as shown. If desired the spacer 84 may also be provided with a plurality of apertures or slits so as to facilitate heat conduction to the wrap 85. The spacer 84 can be of many different forms to achieve the same purpose and may for example comprise a cast member formed say of aluminium and provided with a plurality of longitudinally extending passages or apertures. Furthermore, the spacer 84 may extend the full length of the wrap 85 or only partially therealong.

The unit 81 also optionally includes a plug 88 more clearly shown in FIG. 12b which is formed most suitably of a plastics material and which includes an outer flared flange portion 89 which engages in use with the internal wall of the housing 83, a disc-like body portion 90, and an inner annular portion 91 which locates against the pipe 86. The plug 88 frictionally locates within the housing 83 and the flared flange portion 89 serves through its wedging engagement with the wall of the housing 83 to hold the intumescent wrap 85 in position and prevent it falling from the housing 83. The plug 88 may also be of many different forms to engage the housing 82 to hold the wrap 85 in position whilst in some instances use of a plug 88 is not required.

The flange portion 89 and/or other portions of the plug 88 are suitably apertured at 92 or alternatively or additionally slit as at 93 so as to facilitate the passage of heat to the wrap 85.

In use and assuming that the unit 82 is subject to heat caused say through fire, the intumescent wrap 85 will be exposed to the heat through the apertures 92 and/or slits 93 so as to be caused to expand. The plug 88 may also start to soften or melt and drop away from the housing 82 so as to expose the wrap 85 more to the heat source. Furthermore, the heat will be conducted along the passages 87 of the spacer 84 so as to expose the top section of the wrap 85 to heat so that rapid expansion of the wrap will occur to radially collapse the pipe 86.

Figure 13:
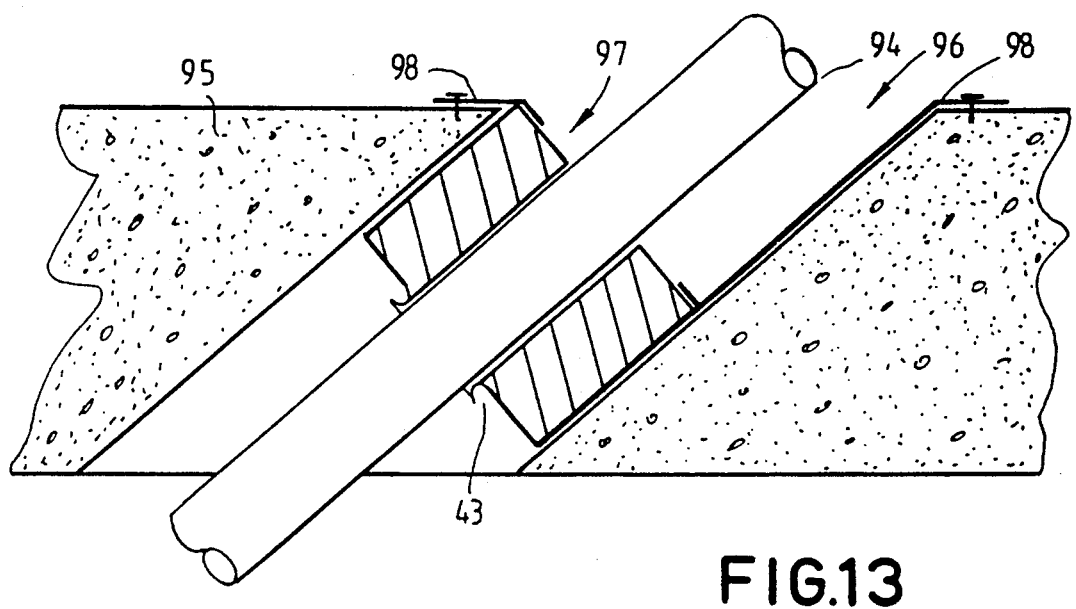
FIG. 13 illustrates a further form of penetration unit according to the present invention for use in angled penetrations of wall, floors or ceilings.

In the embodiment of FIG. 13 a service line or pipe 94 is shown extending at an angle through a wall 95 which may comprise a concrete or gyprock wall or a wall of any other material. Alternatively the wall 95 may comprise a ceiling or a floor. An angled aperture 96 extends through the wall to accommodate the service line 94 and a penetration unit 97 according to the invention surrounds and supports the service line or pipe 94 and provides the required fire rating. The penetration unit 97 is similar to that shown in FIG. 5 except that it is provided with extended fixing flanges 98 which may be extended to one side of the wall 95 to be secured thereto by fasteners. In this embodiment the end retaining flanges may be eliminated.

Figure 14:
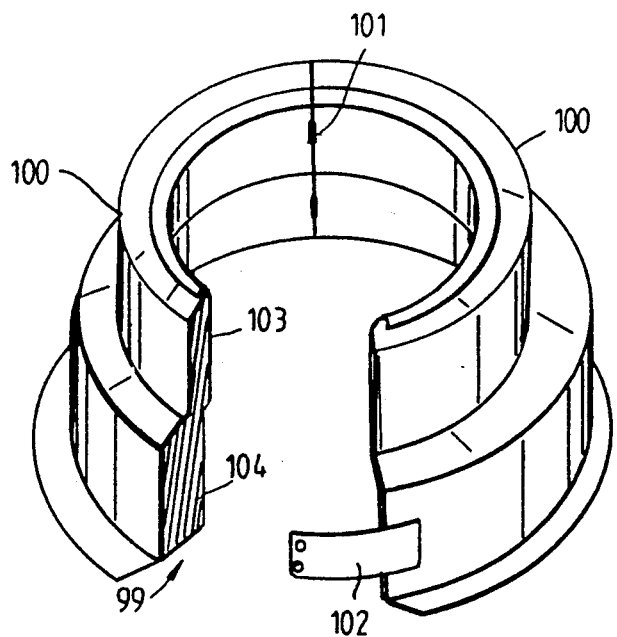
FIG. 14 illustrates a further form of unit according to the invention intended for retrofitting.

The unit 99 illustrated in FIG. 14 is designed for application to existing slab penetrations and locating about a joint between pipes or fittings where a socket is stepped outwardly from a pipe. The unit 99 comprises a pair of housing parts 100 hinged together on one side at 101 by conventional butt hinges or other equivalent arrangement with one of the housing parts including a connecting strap 102 so that the housing parts may be interconnected about a pipe by say riveting or otherwise securing the strap 102 to the other housing part.

Each housing part has a stepped outer wall 102 so that upper and lower layers 103 and 104 of intumescent material can be positioned within the housing part so as to ensure increased fire rating. As shown the upper layer 103 is supported on the lower layer 104. The inner diameter of the upper layer 103 when the housing parts 100 are closed is such as to closely engage about a pipe adjacent say its connection to an elbow or other pipe member through a female coupling and the inner diameter of the lower layer is such as to accommodate that coupling.

The two step intumescent material arrangement as described above may be used with any of the units described above to ensure increased fire rating.

Figure 15:
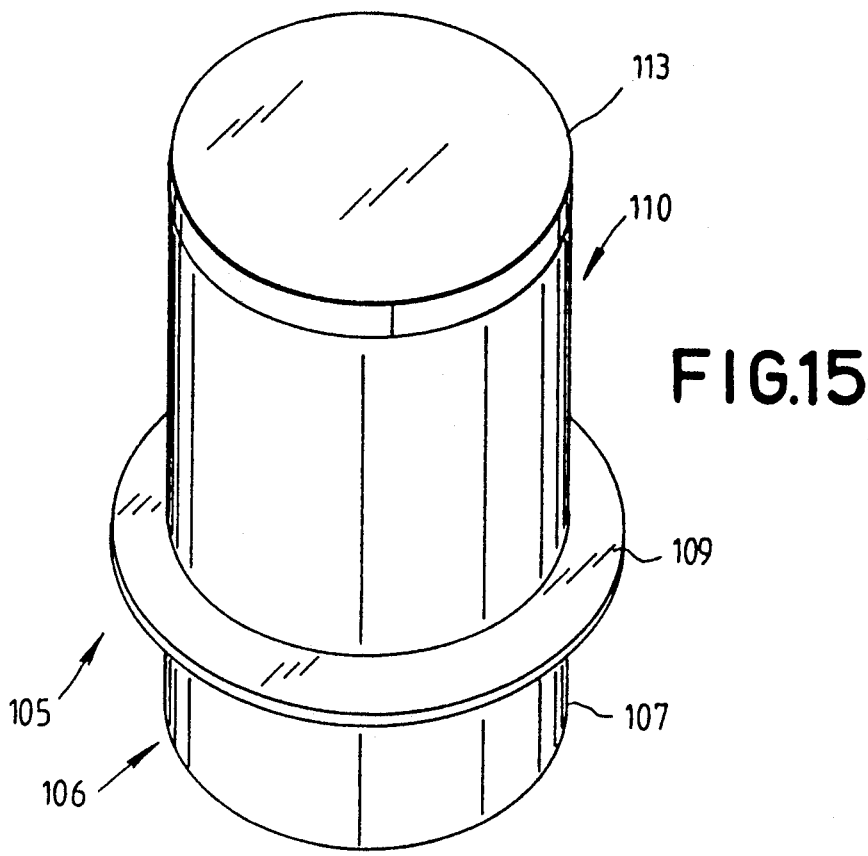
FIG. 15 is a perspective view of a further form of penetration unit according to the present invention.
Figure 16:
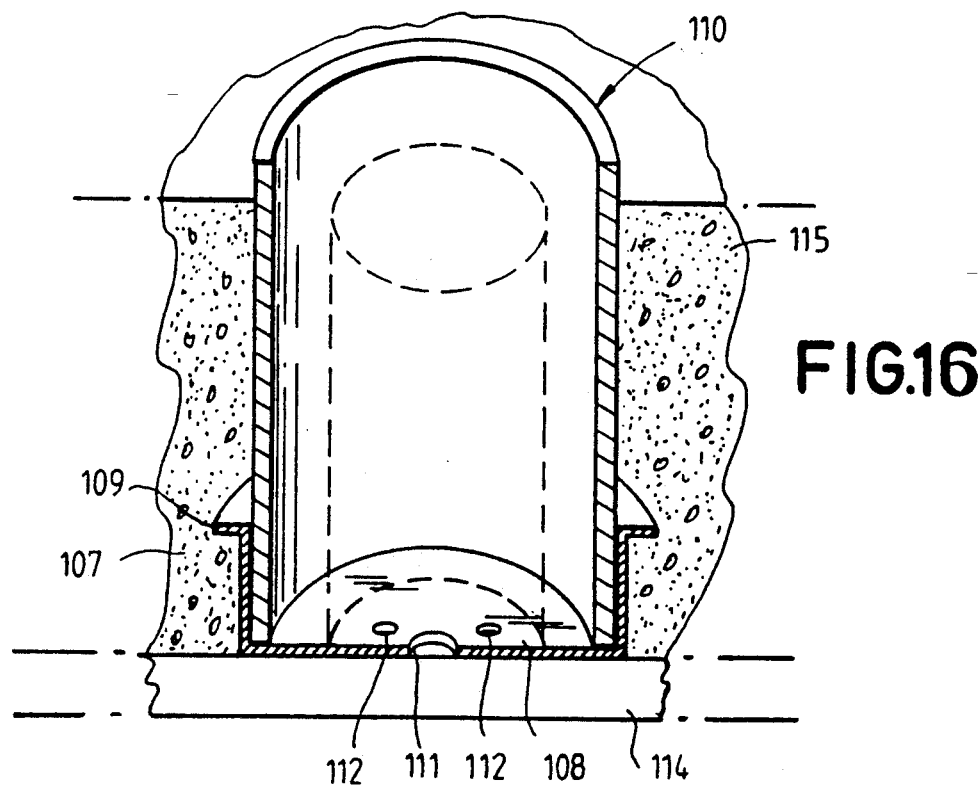
FIG. 16 is a sectional view showing the unit of FIG. 15 located within a concrete slab.

Referring now to FIGS. 15 and 16 there is illustrated a further form of penetration unit 105 according to the present invention which includes a hollow dish-shaped member 106 having a cylindrical side wall 107 extending upwardly from a base 108 and terminating in an outwardly directed flange 109, the latter serving to assist in the retention of the dish-shaped member 106 within a slab.

Removably supported within the dish-shaped member 106 is a sleeve 110 which has an outer diameter substantially the same as the inner diameter of the wall 107 so as to be neatly receivable therein. The base 108 of the dish-shaped member 106, preferably includes a central aperture 111 which serves as a drainage aperture and may include further apertures 112 for receiving clouts or nails therethrough to secure the dish-shaped member 106 to formwork. The sleeve member 110 also preferably includes a removable top cap 113 to prevent the entry of concrete into the sleeve member 110 and dish-shaped body 106.

In use the dish-shaped body 106 is located on formwork 114 at a position thereon where a penetration aperture is required for the passage of a service line or the like. Nails or clouts are then driven through the apertures 112 in the base 108 to secure the unit 105 in position. The sleeve member 110, if not already in place is inserted into the dish-shaped member 106 to extend upwardly therefrom. Concrete or other settable material is then poured onto the formwork 114 about the unit 105 preferably to a level below the sleeve member cap 113. After concrete curing, the formwork 114 is removed and the dish-shaped member 106 and sleeve member 110 will be retained within the slab 115.

The sleeve member 110 may then be removed and the base 108 of the dish-shaped member 106 cut out to the required size to neatly accept a service line or pipe shown in dotted outline therethrough. Concrete is then applied to the space between the service line or pipe and side wall of the aperture formed by the sleeved member 110 and screeded off at the upper level of the slab.

The base of the dish-shaped member 106 being at the lower edge of the slab 115 provides an aesthetically pleasing appearance from below which does not require any further finishing. Further the requisite fire rating is achieved through concrete filling the space between the service line or pipe and the side wall of the formed aperture.

Suitably the dish-shaped members 106 are formed of metal such as copper or alternatively they may be formed of plastics material whilst the sleeve members 110 may be formed of cardboard or any other material.

Each of the above units results in considerable savings in labour as well as well as reducing hazardous and dangerous waste on site which would be required where a normal penetration aperture is required to be patched by other means. Furthermore, the units described may be used in wall, floor or ceiling slabs.

Whilst the above has been given by way of illustrative embodiment of the invention, all such modifications and variations thereto as would be apparent to persons skilled in the art are deemed to fall within the broad scope and ambit of the invention as herein defined in the appended claims. Thus whilst the housings of the units of FIGS. 1 to 14 are preferably of cylindrical configuration, they may be constructed to have an frustoconical shaped wall diverging from the pipe to the connecting flange which is secured to formwork. Other configurations of housing may also be employed such as of rectangular form.

I claim:

1. A penetration assembly including a penetration unit adapted to be embedded in a slab of settable material, and a first tubular service line or pipe, said first service line or pipe being adapted to be connected to a second tubular service line or pipe, said first and second tubular service lines or pipe having complementary coupling means at their ends whereby said first and second service lines or pipes may be interconnected, said penetration unit including:
   a hollow housing, said housing being adapted to be disposed within said slab of settable material adjacent one side thereof, said housing having:
   first and second opposite ends, a first opening at said first end of said housing for receiving said first service line or pipe therethrough,
   a second opening at said second end of said housing, said second opening being larger than said first opening,
   side wall means between said first and second ends of said housing means and surrounding a hollow space within said housing;
   flange means at said second end of said housing surrounding said second opening whereby said housing may be secured to formwork defining said one side of said slab during the formation thereof,
   said first service line or pipe extending into said housing through said first opening and having an end terminating within said hollow space of said housing adjacent said second opening such that an open space surrounds said end of said first service line or pipe, said end of said first service line or pipe being adapted to be connected to said second said service line or pipe via said complementary coupling means in said open space.

2. A penetration assembly according to claim 1 wherein said side wall of said housing means is substantially cylindrical and extends between said second end and an end wall of said housing, said end wall extending inwardly from said cylindrical wall to said first opening.

3. A penetration assembly according to claim 2 wherein said end wall terminates in sleeve means, said sleeve means surrounding said first opening and engaging and supporting said first service line or pipe.

4. A penetration assembly according to claim 1 wherein said housing includes an annular enlargement adapted to be disposed within said slab for retaining said housing within said slab.

5. A penetration assembly according to claim 1 and including puddle flange means arranged about said first service line or pipe, said puddle flange means being adapted to collect water or other moisture passing through said slab, said first service line or pipe being apertured to receive said collected water or moisture.

6. A penetration assembly according to claim 5 and including connecting means for coupling said puddle flange to said housing means.

7. A penetration assembly according to claim 6 wherein said connecting means comprises cooperative annular coupling means on said puddle flange and said housing means.

8. A penetration assembly according to claim 1 wherein said coupling means of said first service line or pipe comprises a male end of said first service line or pipe.

9. A penetration assembly according to claim 1 wherein said coupling means of said first service line or pipe comprises a female socket on the end of said first service line or pipe.

10. A penetration assembly comprising hollow housing means and a first service line or pipe, said first service line or pipe being adapted to be coupled to a second service line or pipe, said first and second service lines or pipes having at their adjacent ends complementary coupling means, said housing means being adapted to be disposed within a slab of settable material adjacent one side thereof, said housing means including first and second opposite ends, a first opening at said first end of said housing means receiving said first service line or pipe, a second opening at said second end of said housing means, said second opening being larger than said first opening, said housing means including side wall means between said first and second ends of said housing means and surrounding a hollow space within said housing means, annular flange means at said second opening whereby said housing means surrounding said second opening whereby said housing means may be secured to formwork defining said one side of said slab during the formation thereof, an intumescent material within said housing means, said material only filling part of said hollow space and leaving free an open region in said hollow space adjacent said second end of said housing means and opening to the underside of said slab, said first service line or pipe extending into and having its end terminating in said open region, said material expanding when subject to heat to close over said first service line or pipe and prevent smoke gas or flames from passing therethrough, said first service line or pipe being adapted to be coupled to said second service line or pipe in said open region via said complementary coupling means.

11. A penetration assembly according to claim 10 and including tab means for maintaining said material within said housing means, said tab means comprising portion of said side wall means displaced from said side wall means.

12. A penetration assembly according to claim 10 and including an insert in said hollow space for retaining said material in said space, said insert including a cylindrical wall spaced from said service line or pipe, said material being disposed between said cylindrical wall and said side wall means of said housing means.

13. A penetration assembly according to claim 10 and including outwardly directed flange means surrounding said first opening, said flange means cooperating with said settable material to maintain said housing means within said slab.

14. A penetration assembly according to claim 10 and including spacer means between said intumescent material and said side wall means of said housing means, said spacer means defining a plurality of passages for communicating heat to said intumescent material adjacent said first end of said housing means.

15. A penetration according to claim 10 and including retainer flange means engaging said side wall of said housing means and retaining said material adjacent said first end of said housing means, said flange means being apertured to permit the passage of heat therethrough.

16. A penetration assembly according to claim 10 and including first and second opposite closure members disposed at said second end of said housing means, and biasing means for biasing said closure members inwardly towards each other, said closure members closing off said service line or pipe upon softening thereof when subject to heat.

17. A penetration according to claim 16 and including heat sensitive means maintaining said closure members spaced from said service line or pipe, said heat sensitive means releasing said closure members to close said service line or pipe when subject to heat.

18. A first stop collar assembly comprising hollow housing means, and a first service line or pipe, said first service line or pipe being adapted to be coupled to a second service line or pipe, said first and second service lines or pipes having complementary coupling means, said housing means including first and second opposite ends, a first opening at said first end of said housing means, a second opening at said second end of said housing means, said second opening being larger than said first opening, said housing means including side wall means between said first and second ends of said housing means and surrounding a hollow space within said housing means, an intumescent material within said housing means adjacent said first end of said housing means, said material leaving free a region of said hollow space in said housing means adjacent the second end thereof, said first service line extending through said first opening and terminating in said region, said material expanding when subject to heat to close over said first service line or pipe and prevent smoke gas or flames from passing therethrough, said first service line or pipe being adapted to be coupled to said second said service line or pipe in said region via said complementary coupling means.

19. A penetration assembly including a penetration unit, and a first service line or pipe, said first service line or pipe being adapted to be coupled to a second service line or pipe, said first and second service lines or pipes having at their adjacent ends complementary coupling means, said penetration unit including a hollow housing adapted to be disposed within a slab of settable material adjacent one side thereof, said housing including first and second opposite ends, a first opening at said first end of said housing receiving said first service line or pipe, a second opening at said second end of said housing, said second opening being larger than said first opening, said housing including side wall means between said first and second ends of said housing and surrounding a hollow space within said housing, annular flange means at said second end of said housing surrounding said second opening whereby said housing may be secured to formwork defining said one side of said slab during the formation thereof, an intumescent material within said space and disposed adjacent said first end of said housing, said open region opening to the underside of said slab, said first service line or pipe extending through said first opening and having its end terminating in said open region, said material expanding when subject to heat to close over said first service line or pipe to prevent smoke, gas, or flames from passing therethrough, said first service line or pipe being coupled to said second service line or pipe in said open region via said complementary coupling means.

* * * * *